(12) United States Patent
Tseng

(10) Patent No.: US 9,074,696 B2
(45) Date of Patent: Jul. 7, 2015

(54) HYDRAULIC VALVE AND PRESSURE DIFFERENTIAL TYPE LIQUID DISPENSER HAVING THE SAME

(71) Applicant: Yu-Cheng Tseng, Taichung (TW)

(72) Inventor: Yu-Cheng Tseng, Taichung (TW)

( * ) Notice: Subject to any disclaimer, the term of this patent is extended or adjusted under 35 U.S.C. 154(b) by 215 days.

(21) Appl. No.: 13/943,806

(22) Filed: Jul. 17, 2013

(65) Prior Publication Data

US 2015/0020898 A1   Jan. 22, 2015

(51) Int. Cl.
*G05D 7/00* (2006.01)
*F16K 11/10* (2006.01)
*B01D 61/10* (2006.01)

(52) U.S. Cl.
CPC .............. *F16K 11/105* (2013.01); *B01D 61/10* (2013.01); *Y10T 137/7838* (2015.04)

(58) Field of Classification Search
USPC ...................................... 137/102, 596, 596.2
See application file for complete search history.

(56) References Cited

U.S. PATENT DOCUMENTS 2,841,142 A * 7/1958 Hay .......................... 128/205.13
3,942,547 A * 3/1976 Pfitzner ......................... 137/102

\* cited by examiner

*Primary Examiner* — Kevin Murphy
*Assistant Examiner* — R. K. Arundale

(57) ABSTRACT

A hydraulic valve includes a valve housing and three valve members. The valve housing includes an inlet port, a lateral port for connection to a reservoir, an outlet port, and a chamber. The valve housing further defines a bypass for connection of the inlet port and the chamber, a first passageway for connection of the chamber and the lateral port, a second passageway for connection of the inlet port and the first passageway, and a third passageway for connection of the chamber and the outlet port. The first one-way valve member permits fluid flow from the inlet port through the second passageway to the first passageway only. The regulation valve member is configured to be actuated by fluid coming from the first passageway to cause disconnection between the chamber and the first passageway. The second one-way valve member permits fluid flow from the chamber through the third passageway to the outlet port only.

12 Claims, 12 Drawing Sheets

HYDRAULIC VALVE AND PRESSURE DIFFERENTIAL TYPE LIQUID DISPENSER HAVING THE SAME

BACKGROUND OF THE INVENTION

1. Field of the Invention

The present invention relates to a hydraulic valve and a liquid dispenser having the hydraulic valve, and more particularly to a pressure differential type liquid dispenser adapted to be connected to a water purification system to collect liquid waste and dispense the same for recycling.

2. Description of the Related Art

It is known that, by the process of reverse osmosis (RO), the total dissolved solids in residential drinking water can be drastically reduced. This is accomplished by forcing water from a municipal delivery system or a well, through a membrane. The liquid that passes through the membrane is known as the permeate, while the liquid that does not pass through the membrane is called the brine. The permeate is stored in a pressure tank and the brine is discharged to a waste line. The relationship between the permeate and the brine is determined by the saturation of dissolved solids in the source water that can vary widely. In an attempt to commercially accommodate this variation, a fixed relationship is preset by a fixed orifice. This orifice typically allots three parts brine to one part permeate as a one-size-fits-all device, which means that to get one part purified water, three parts water will be wasted. This is environmental unfriendly to waste so much water just to get little drinking water. Thus, there is a need to solve this problem.

SUMMARY OF THE INVENTION

It is an objective of the present invention to provide a liquid dispenser to collect liquid waste from a water purification system and dispense the collected liquid waste for recycling.

It is another objective of the present invention to provide a pressure differential type liquid dispenser such that no extra pump is needed for discharging liquid out of the liquid dispenser.

To achieve the foregoing objective, the liquid dispenser includes a reservoir and a hydraulic valve. The hydraulic valve includes a valve housing, a first one-way valve member, a regulation valve member, and a second one-way valve member. The valve housing includes an inlet port for connection to an inlet pipeline, a lateral port for connection to a reservoir, an outlet port for connection to an outlet pipeline, and a chamber. The valve housing further defines a bypass through which the inlet port is in fluid communication with the chamber, a first passageway through which the chamber is in selective fluid communication with the lateral port, a second passageway through which the inlet port is in selective fluid communication with the first passageway, and a third passageway through which the chamber is in fluid communication with the outlet port.

The first one-way valve member is disposed in between the inlet port and the second passageway to permit fluid flow in a direction from the inlet port to the second passageway only. The regulation valve member, which is disposed in the chamber of the valve housing, is movable between an open position where the first passageway is in fluid communication with the third passageway via the chamber, and a close position where the first passageway is blocked from fluid communication with the chamber. The regulation valve member moves to the open position if actuated by fluid coming from the first passageway, and to the close position if actuated by fluid coming from the bypass. The second one-way valve member is disposed in between the third passageway and the outlet port to permit fluid flow from the third passageway to the outlet port only. Moreover, the reservoir is provided with a neck which is fitted in the lateral port of the hydraulic valve to mount the hydraulic valve on the reservoir.

Another object in accordance with the present invention is the provision of a hydraulic valve, as disclosed above, for the liquid dispenser.

Further benefits and advantages of the present invention will become apparent after a careful reading of the detailed description with appropriate reference to the accompanying drawings.

DETAILED DESCRIPTION OF EMBODIMENTS

Figure 1:
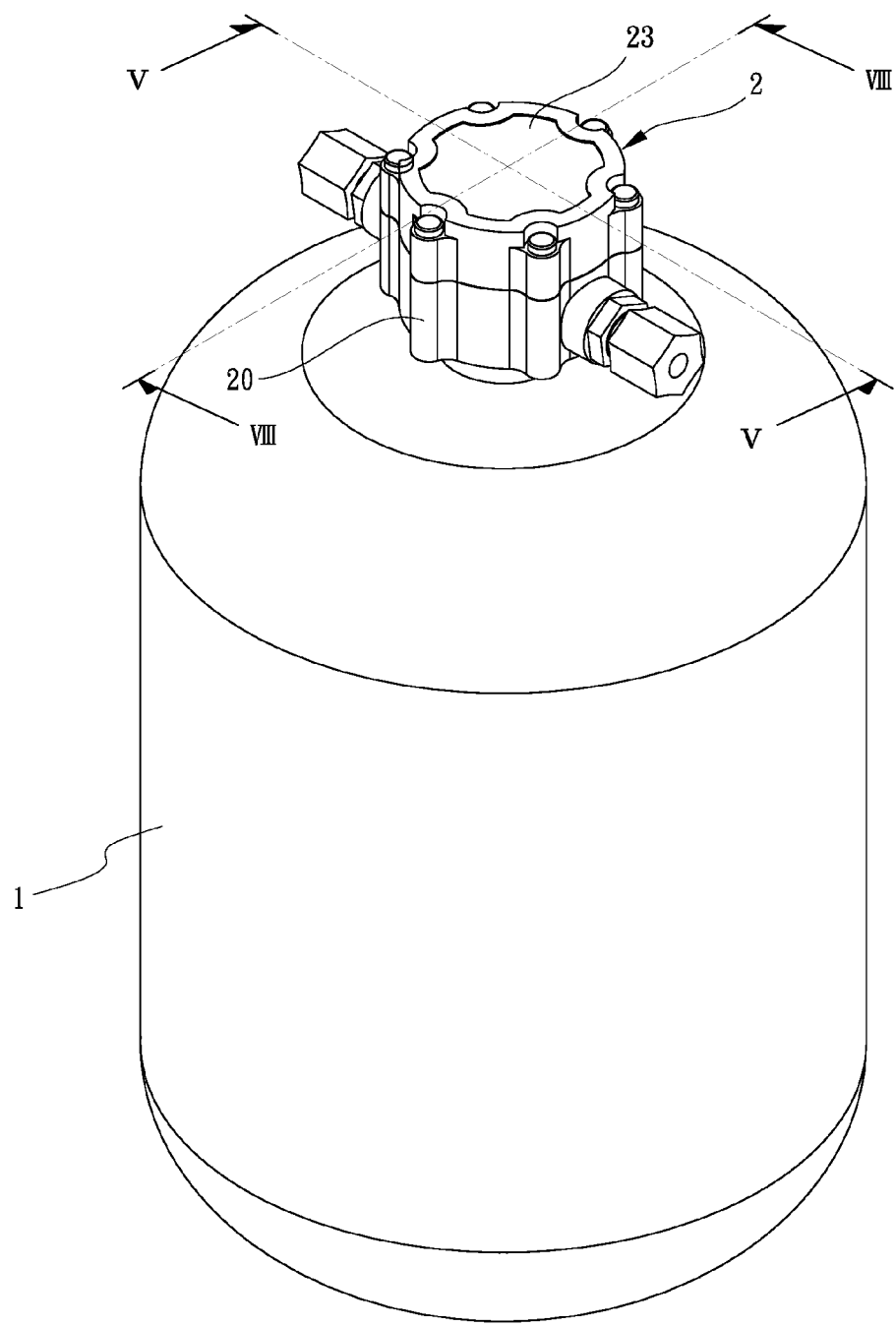
FIG. 1 is a perspective view of a liquid dispenser in accordance with a first embodiment of the present invention.
Figure 2:
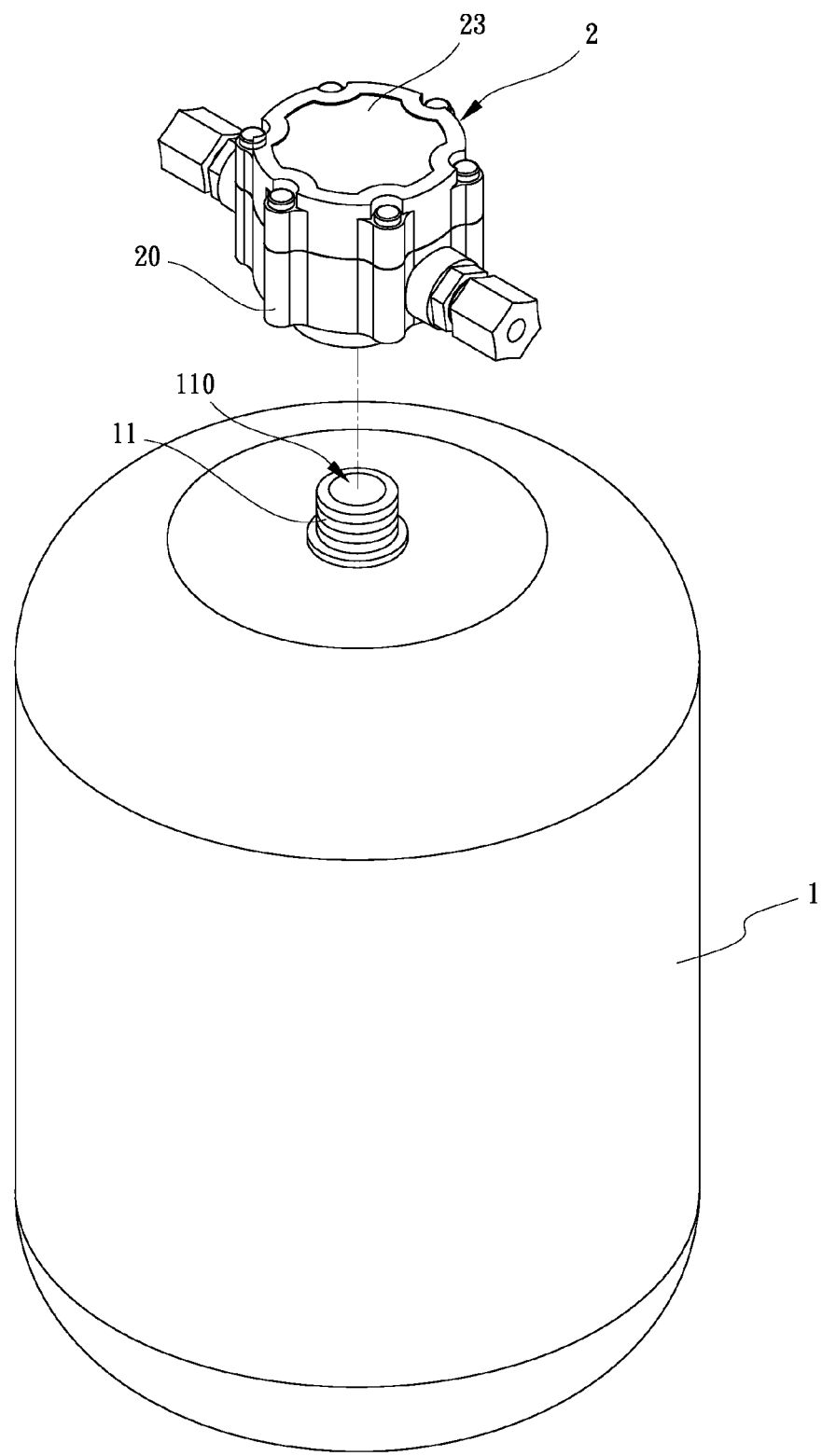
FIG. 2 is an exploded perspective view of the liquid dispenser shown in FIG. 1.

Referring to the drawings and initially to FIGS. 1-10, a pressure differential type liquid dispenser is provided in accordance with a first embodiment of the present invention. As shown in FIG. 2, the liquid dispenser generally includes a reservoir 1 and a hydraulic valve 2. The reservoir 1 defines an opening 110 in a neck 11 thereof. The hydraulic valve 2 has a valve housing that includes a valve body 20 and a bonnet 23 coupled to the valve body 20.

Figure 3:
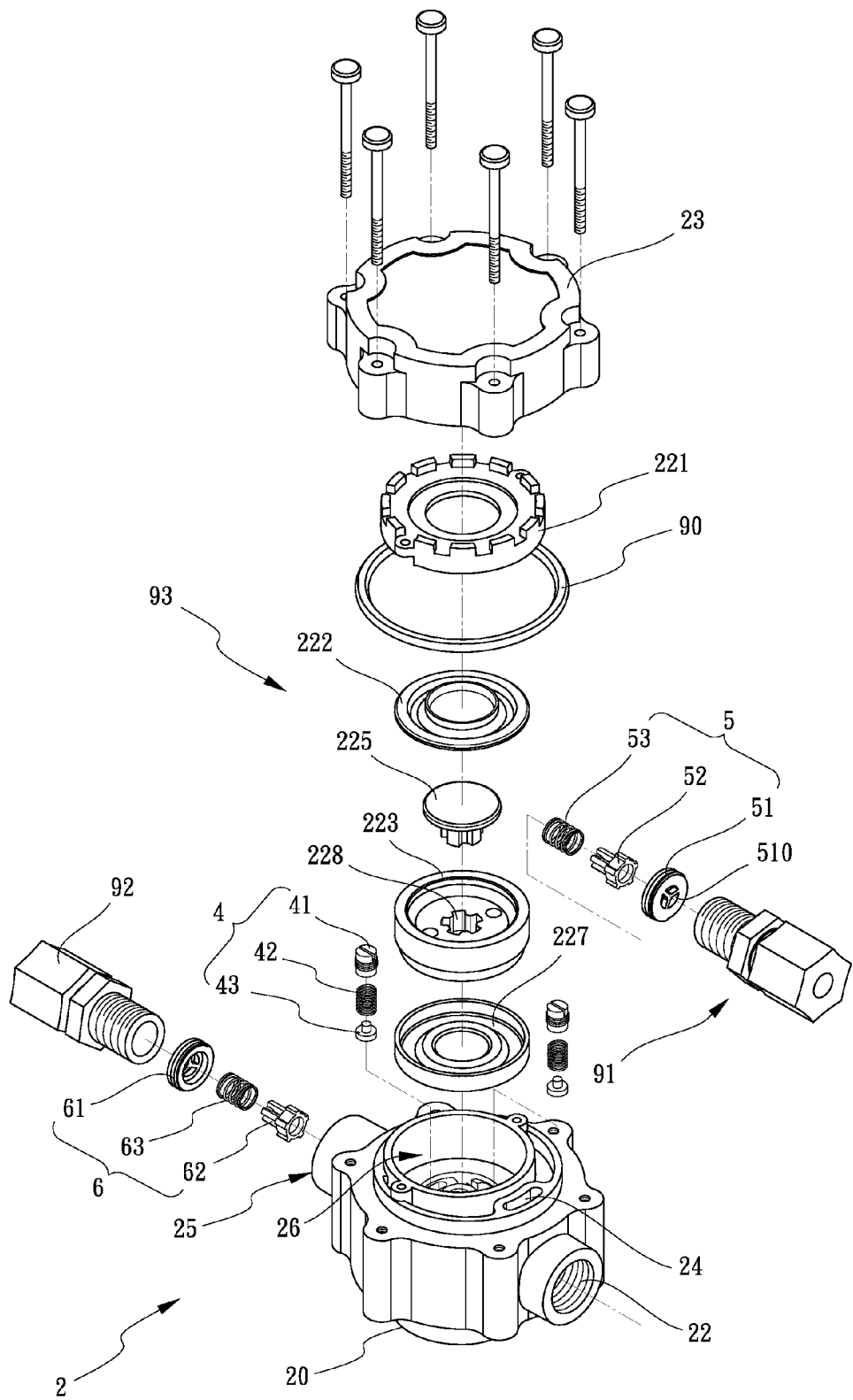
FIG. 3 is an exploded perspective view of a hydraulic valve shown in FIG. 2.
Figure 8:
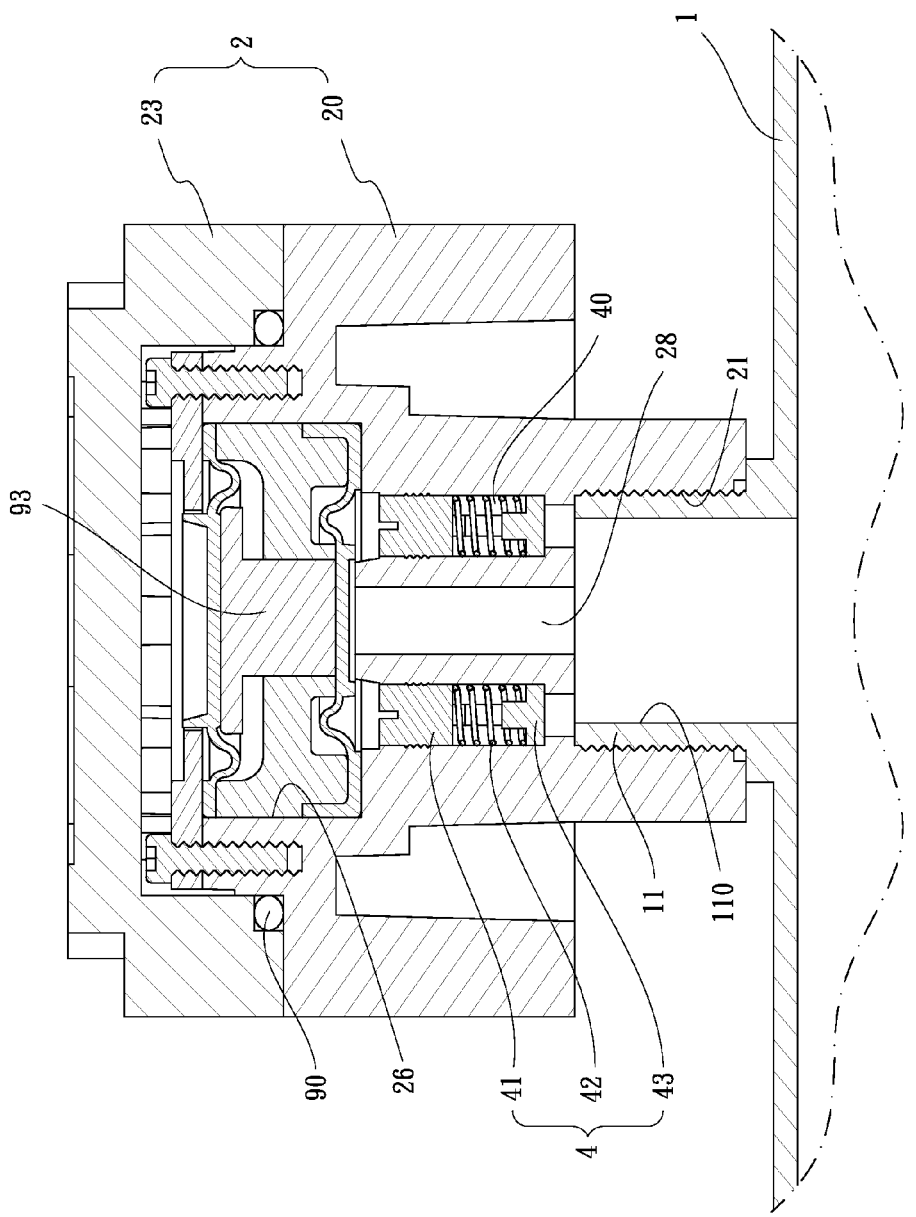
FIG. 8 is a partial cross sectional view of the liquid dispenser taken along line VIII-VIII of FIG. 1.

Referring to FIG. 3, an O-ring 90 is included to seal the valve body 20 and the bonnet 23, as best seen in FIG. 8. Moreover, the hydraulic valve 2 further includes in the valve housing a first one-way valve member 5, a regulation valve member 93, and a second one-way valve member 3.

Figure 5:
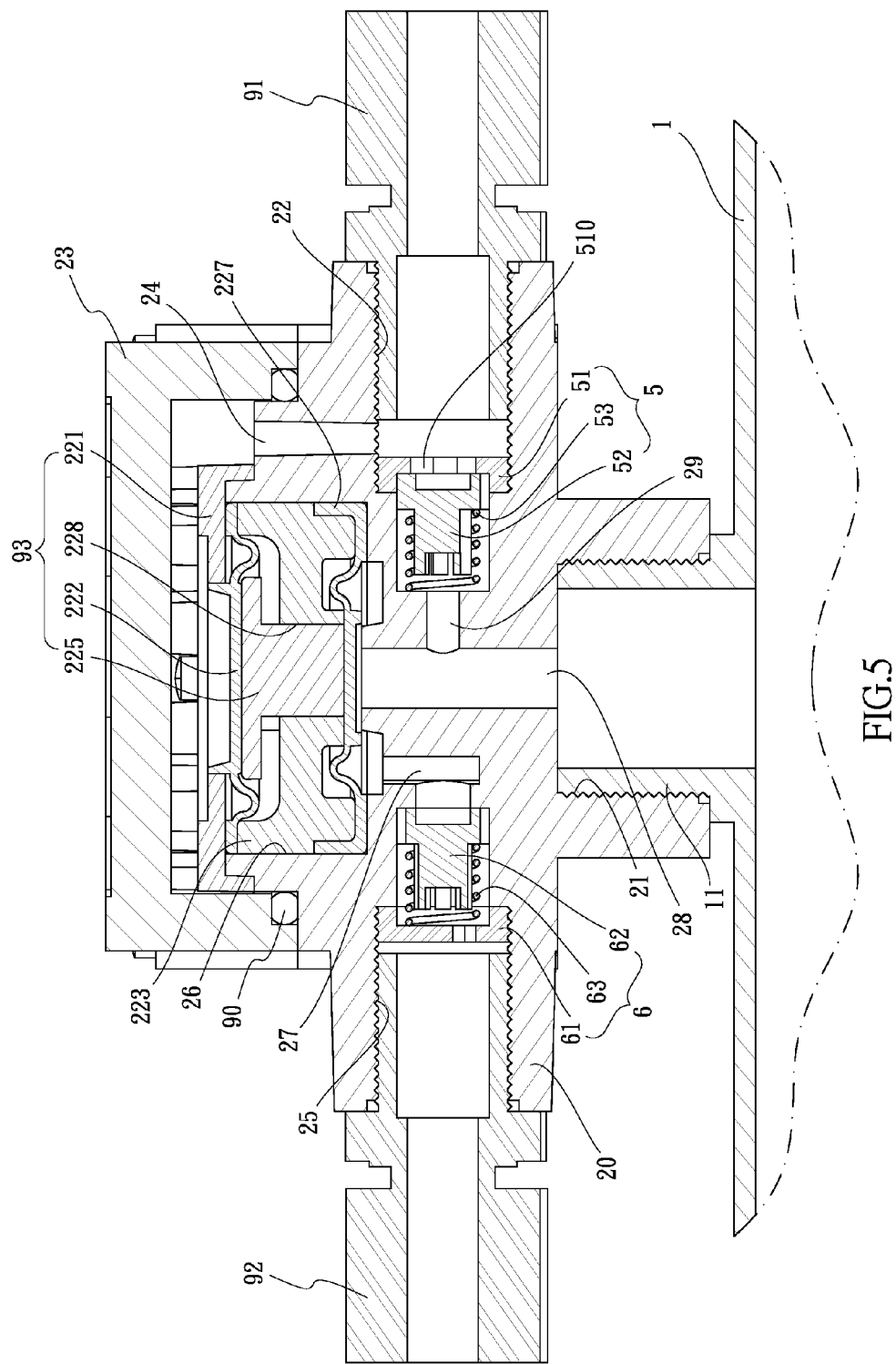
FIG. 5 is a partial cross sectional view of the liquid dispenser taken along line V-V of FIG. 1.
Figure 9:
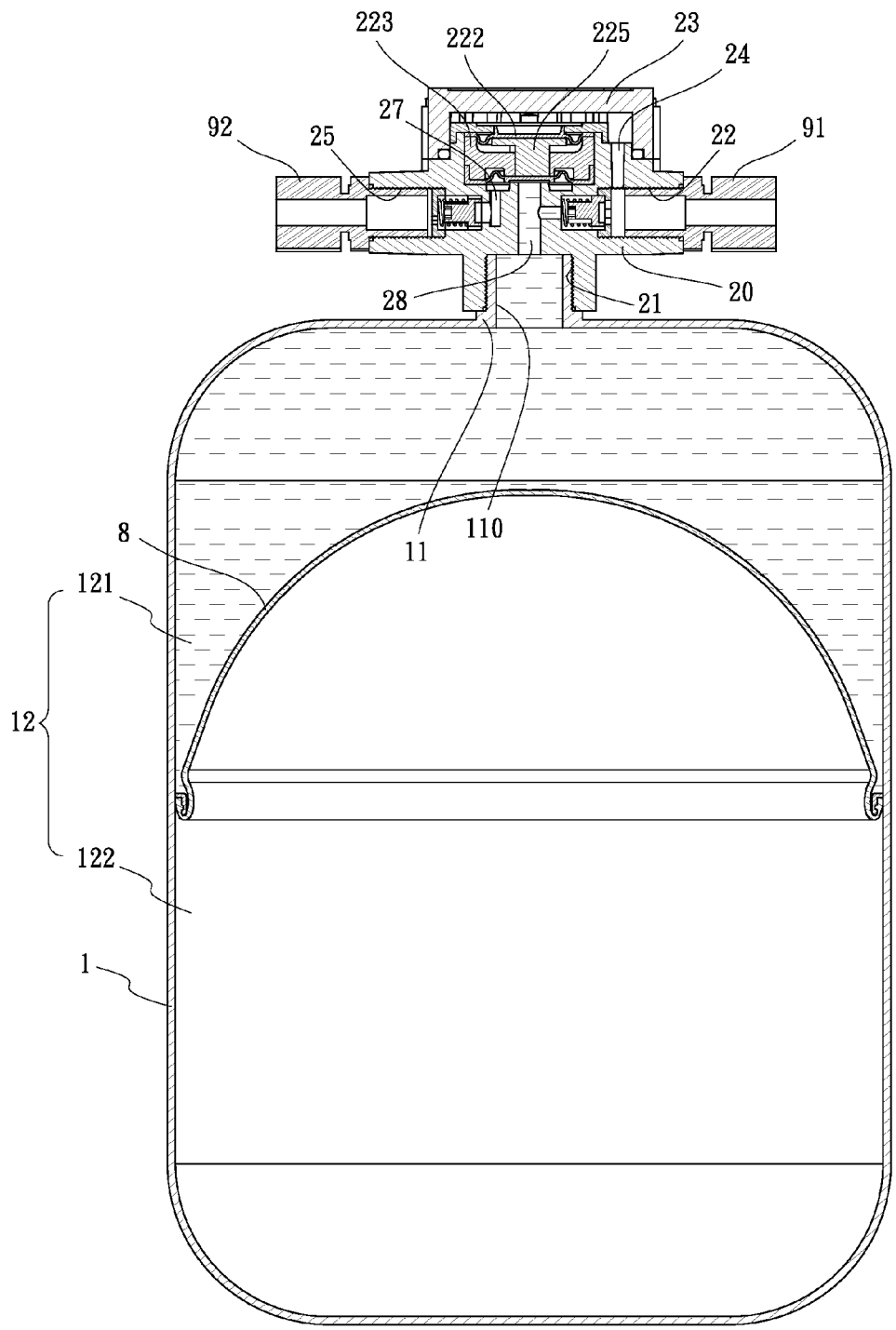
FIG. 9 is a cross sectional view of the liquid dispenser taken along line V-V of FIG. 1.
Figure 12:
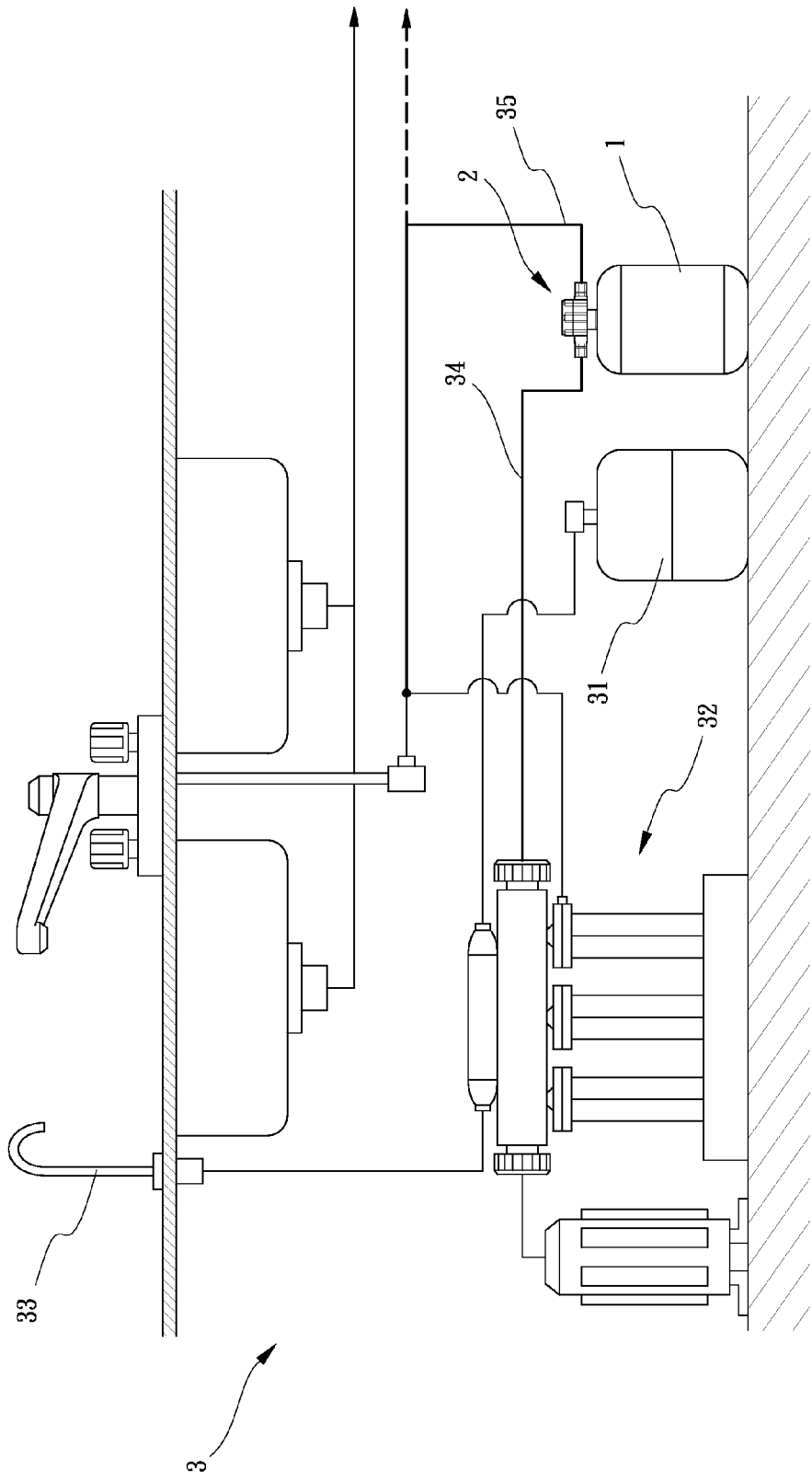
FIG. 12 is a flow diagram, showing that the liquid dispenser is connected to a water purification system for liquid waste recycling.

As best seen in FIG. 5, the valve body 20 of the valve housing includes a inlet port 22 for connection to an inlet pipeline 34 (see FIG. 12) and an outlet port 25 for connection to an outlet pipeline 35 (see FIG. 12). The valve body 20 further includes a lateral port 21 threaded for reception of the threaded neck 11 of the reservoir 1 so that the hydraulic valve 2 is mounted on the reservoir 1, as depicted in FIG. 9. In addition, the valve housing defines a chamber 26 in between the valve body 20 and the bonnet 23 to house the regulation valve member 93. The valve body 20 further defines a bypass 24 through which the inlet port 22 is in fluid communication with the chamber 26, a first passageway 28 through which the chamber 26 is in selective fluid communication with the lateral port 21, a second passageway 29 through which the inlet port 22 is in selective fluid communication with the first passageway 28, and a third passageway 27 through which the chamber 26 is in fluid communication with the outlet port 25. In addition, the hydraulic valve 2 further comprises an inlet pipe fitting 91 and an outlet pipe fitting 92. The inlet port 22 and the outlet port 25 are threaded for receiving the threaded inlet fitting 91 and outlet pipe fitting 92 respectively.

Referring again to FIG. 5, the first one-way valve member 5 is disposed in between the inlet port 22 and the second passageway 29 to permit fluid flow in a direction from the inlet port 22 through the second passageway 29 to the first passageway 28 only. In this embodiment, the second passageway 29 is stepped in shape and has a small-diameter section adjacent to the first passageway 28 and a large-diameter section in which the first one-way valve member 5 is located.

The regulation valve member 93 is disposed in the chamber 26 of the valve housing and is movable between a lower, close position (see FIG. 6) where the first passageway 28 is blocked from fluid communication with the chamber 26, and an upper, open position (see FIG. 7) where the first passageway 28 is in fluid communication with third passageway 27 via the chamber 26. As shown in FIG. 7, the second one-way valve member 6 is movably disposed in between the third passageway 27 and the outlet port 25 to permit fluid flow in a direction from the third passageway 27 to the outlet port 25 only. In this embodiment, the third passageway 27 is L-shaped and has a vertical section adjacent to the chamber 26 and a horizontal section where the second one-way valve member 6 is located.

Referring to FIG. 3, the first one-way valve member 5 includes a seat body 51, a plug 52 and a spring 53. As shown in FIG. 5, the seat body 51 is secured in the inlet port 22. The plug 52 is slidably seated in the seat body 51. The spring 53 urges the plug 52 toward the seat body 51 to releasably block holes 510 defined in the seat body 51. Thus, the first one-way valve member 5 normally allows fluid to flow through it in only the direction from the inlet port 22 to the second passageway 29. Likewise, the second one-way valve member 6 includes a seat body 61 secured in the outlet port 25, a plug 62 slidably seated in the seat body 61 and a spring 63 urging the plug 62 away from the seat body 6 to releasably block the third passageway 27. Thus, the second one-way valve member 6 normally allows fluid to flow through it in only the direction from the third passageway 27 to the outlet port 25.

Referring back to FIG. 3, the regulation valve member 93 includes a valve seat 223, an upper diaphragm seal 222, a lower diaphragm seal 227, and a piston 225. As shown in FIG. 5, the upper diaphragm seal 222 is attached to a top of the valve seat 223 while the lower diaphragm seal 227 is attached to a bottom of the valve seat 223. The piston 225 is slidably inserted in a central bore 228 of the valve seat 223 and is covered by the upper diaphragm seal 222. Moreover, the piston 225 is slidable towards and away from the first passageway 28 to permit disconnection or connection of the chamber 26 to the first passageway 28, as illustrated in FIGS. 6 and 7.

Figure 6:
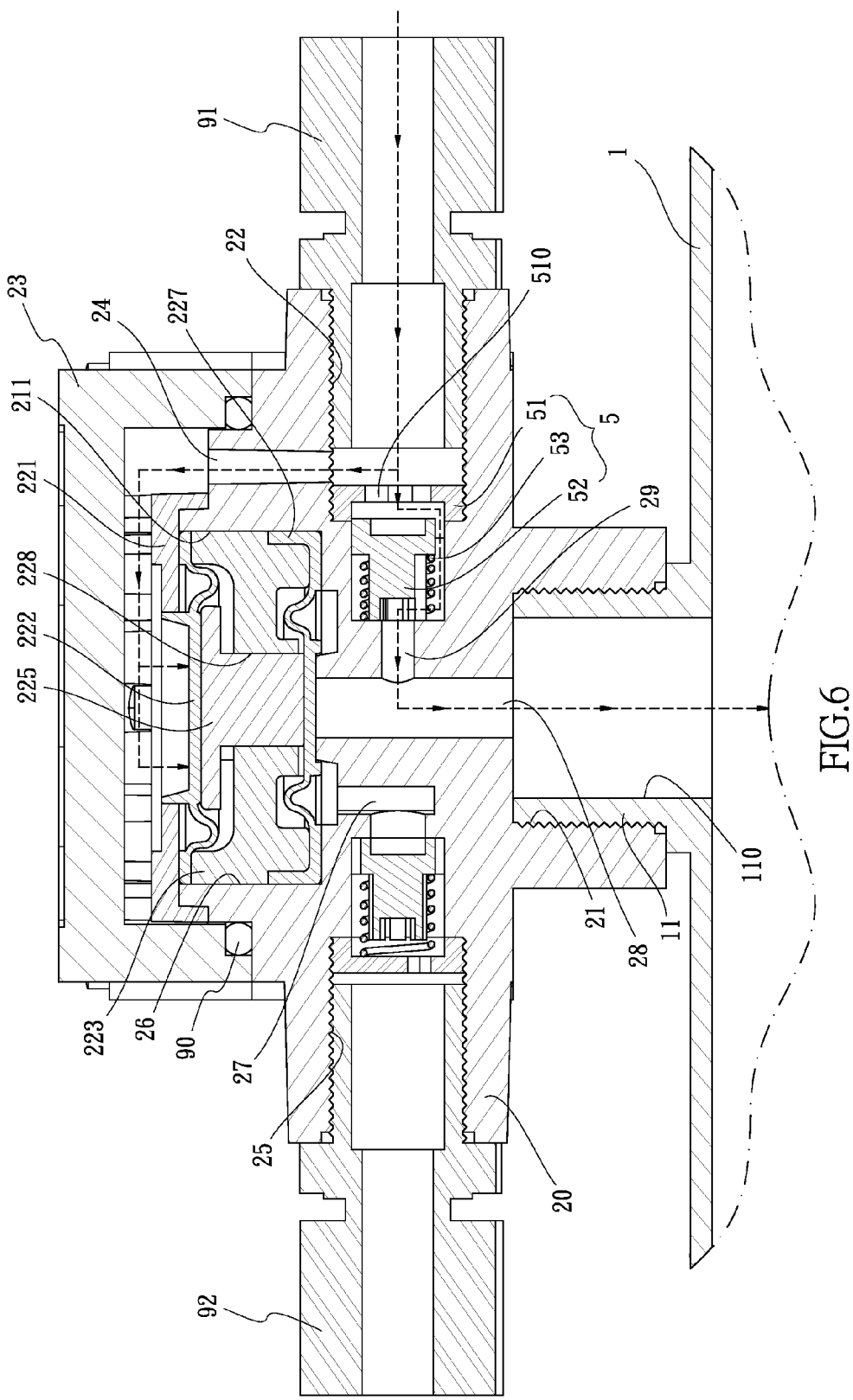
FIG. 6 is a view similar to FIG. 5, showing a flow direction when the inlet port water is fed with water.
Figure 7:
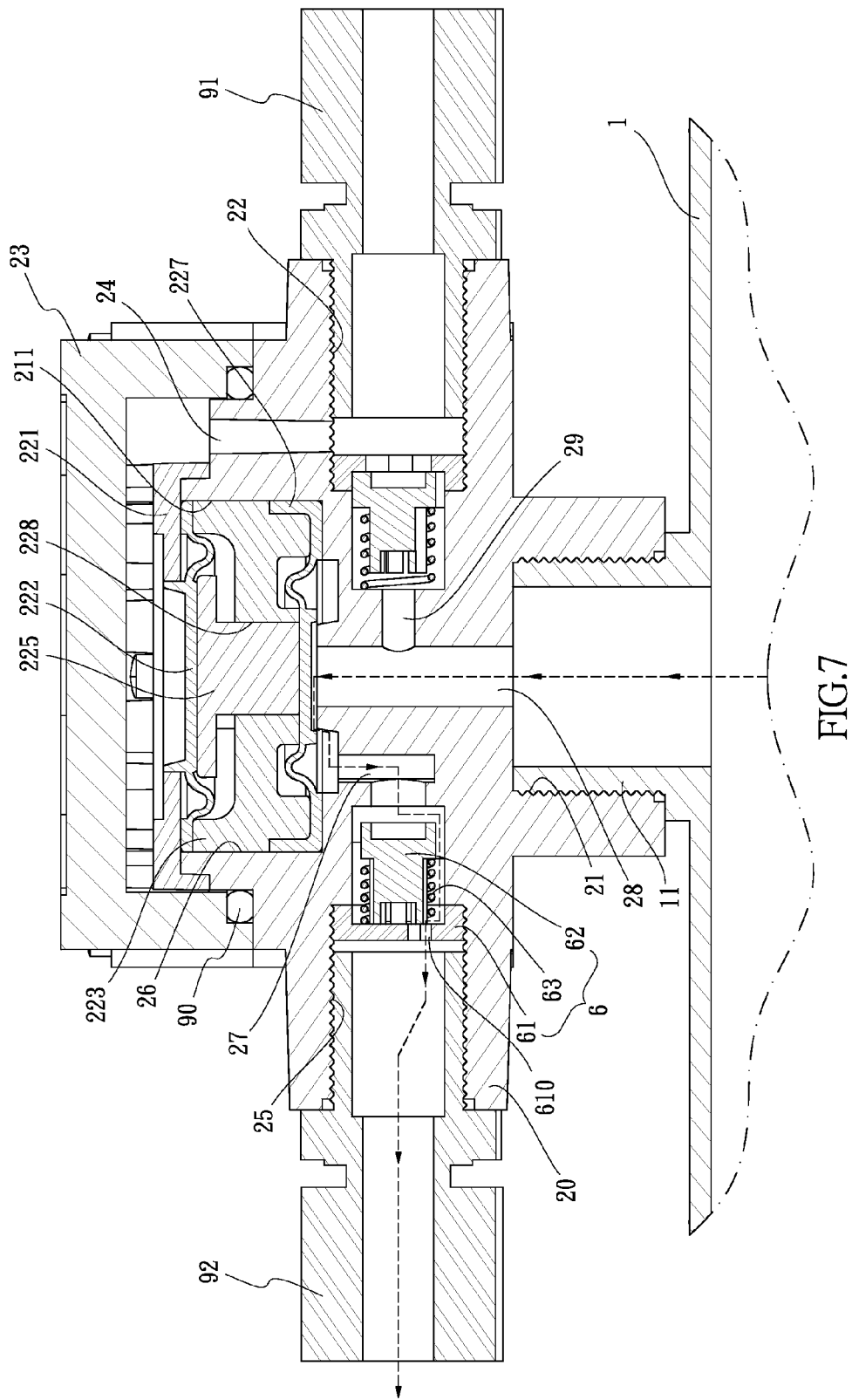
FIG. 7 is a view similar to FIG. 5, showing a flow direction when the water stored in the reservoir drains out through the outlet port.

Preferably, the regulation valve member 93 may includes a guide disk 226, as shown in FIG. 3, which is disposed above the upper diaphragm seal 222 to guide the fluid coming from the bypass 24 towards the piston 225, as best seen in FIG. 6.

Referring to FIG. 12, the liquid dispenser of the present invention is adapted to be used in a residential drinking water system 3. The system 3 is connected to a municipal delivery system (not shown) and generally includes a reverse osmosis device 32, a purified liquid storage tank 31 and a faucet 33. During the process of reverse osmosis, water from the municipal delivery system is forced to pass through a membrane of the reverse osmosis device 32. The liquid that passes through the membrane is known as the permeate, while the liquid that does not pass through the membrane is called the brine. The permeate is then stored in the purified liquid storage tank 31 and the brine is discharged through the inlet pipeline 34 to be stored in the reservoir 1 of the liquid dispenser of the present invention. Afterward, the recycled brine in the reservoir 1 may be discharged to the outlet pipeline 35 for a second use, such as for water gardening.

In operation, as shown in FIG. 6, when the brine flows from the inlet pipeline 34 into the inlet port 22 of the hydraulic valve 2, the brine may then go through a first path, namely the second passageway 29, to enter the first passageway 28 or through a second path, namely the bypass 24, to the chamber 26, as indicated by the arrows. Liquid that goes though the bypass 24 will be guided by the guide disk 226 to push indirectly the piston 225 downward such that the first passageway 28 is blocked from fluid communication between the chamber 26. In other words, the regulation valve member 93 moves to the close position if actuated by fluid coming from the bypass 24. On the other hand, liquid that goes by the first one-way valve member 5 and through the second passageway 29 will enter into the first passageway 28, the opening 110 in the neck 11 and finally be stored in the reservoir 1, as shown in FIG. 9. It is noted that, while the liquid goes by the first one-way valve member 5, the spring 53 is pressed by the liquid to release the plug 52 from the seat body 51 and therefore unblock the holes 510 of the seat body 51. It is also noted that since the regulation valve member 93 is in its close position, the liquid in the first passageway 28 will not flow into the chamber 26.

Figure 10:
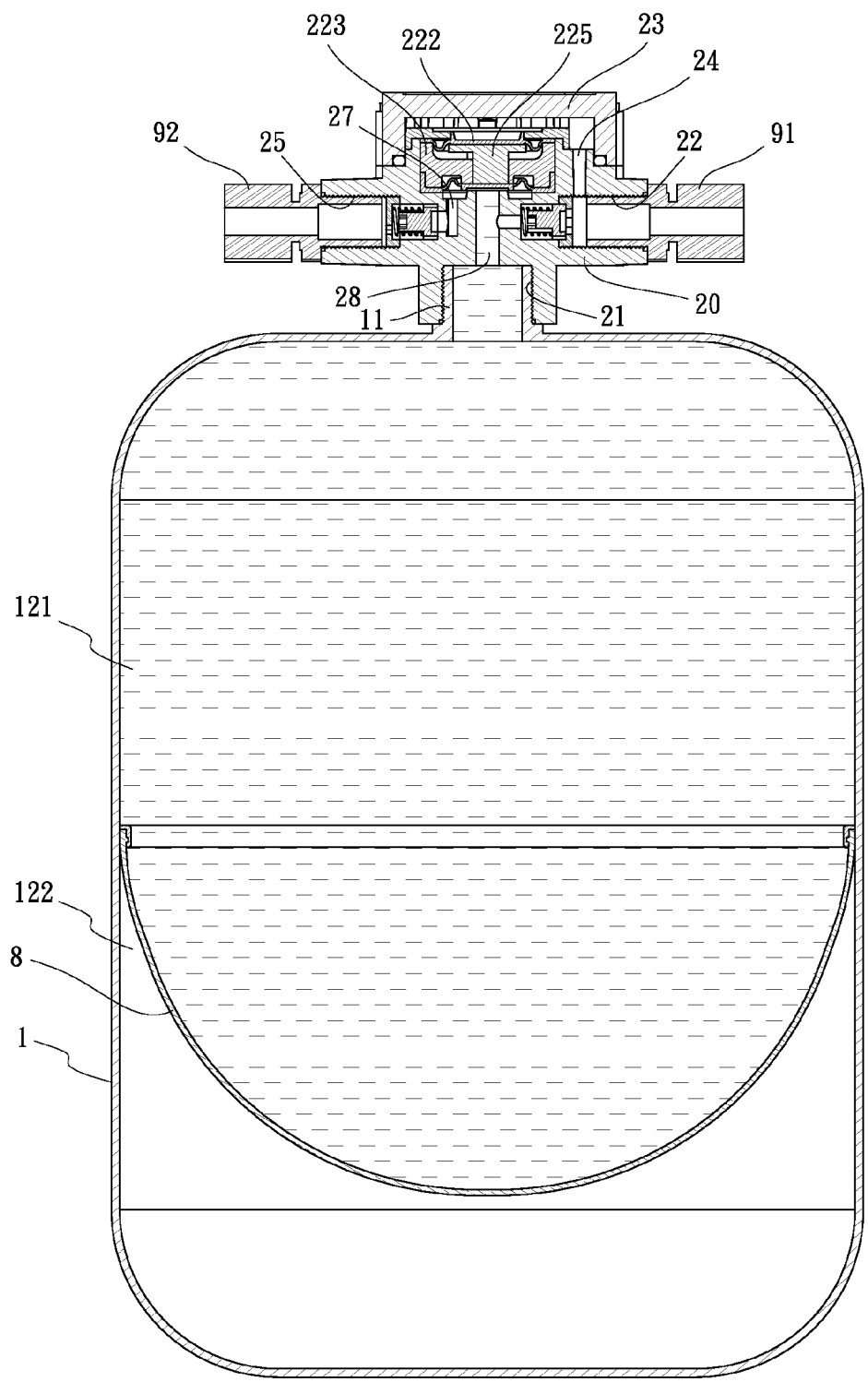
FIG. 10 is a view similar to FIG. 9, showing the water collected in the reservoir of the liquid dispenser is increased.

When the reservoir 1 is full of liquid with a predetermined pressure, as shown in FIG. 10, an user may shut off the inlet pipeline 34 to stop the brine from entering into the inlet port 22 of the hydraulic valve 2 and then open up the outlet pipeline 35 for dispensing the liquid, such as for water gardening. At this time, as shown in FIG. 7, the pressure differential between the reservoir 1 and the outlet pipeline 35 automatically drives the liquid reflows from the reservoir 1 back to the first passageway 28, which then pushes indirectly the piston 225 upward to permit the liquid flow into the third passageway 27 via the chamber 26, as indicated by the arrows. In other words, the regulation valve member 93 moves to the open position if actuated by fluid coming from the first passageway 28. The liquid entering the third passageway 27 will then go by the second one-way valve member 6 to the outlet port 25, and finally to the outlet pipeline 35 for a second use. It is noted that, while the liquid goes by the second one-way valve member 6, the spring 63 is pressed by the liquid and moves toward the seat body 61 so as to unblock the third passageway 27 for allowing fluid flow from the third passageway 27 through holes 610 of the seat body 61 to the outlet port 25. It is also noted that the liquid in the first passageway 28 will not reflow back to the second passageway 29 as a result of the first one-way valve member 5.

Figure 4:
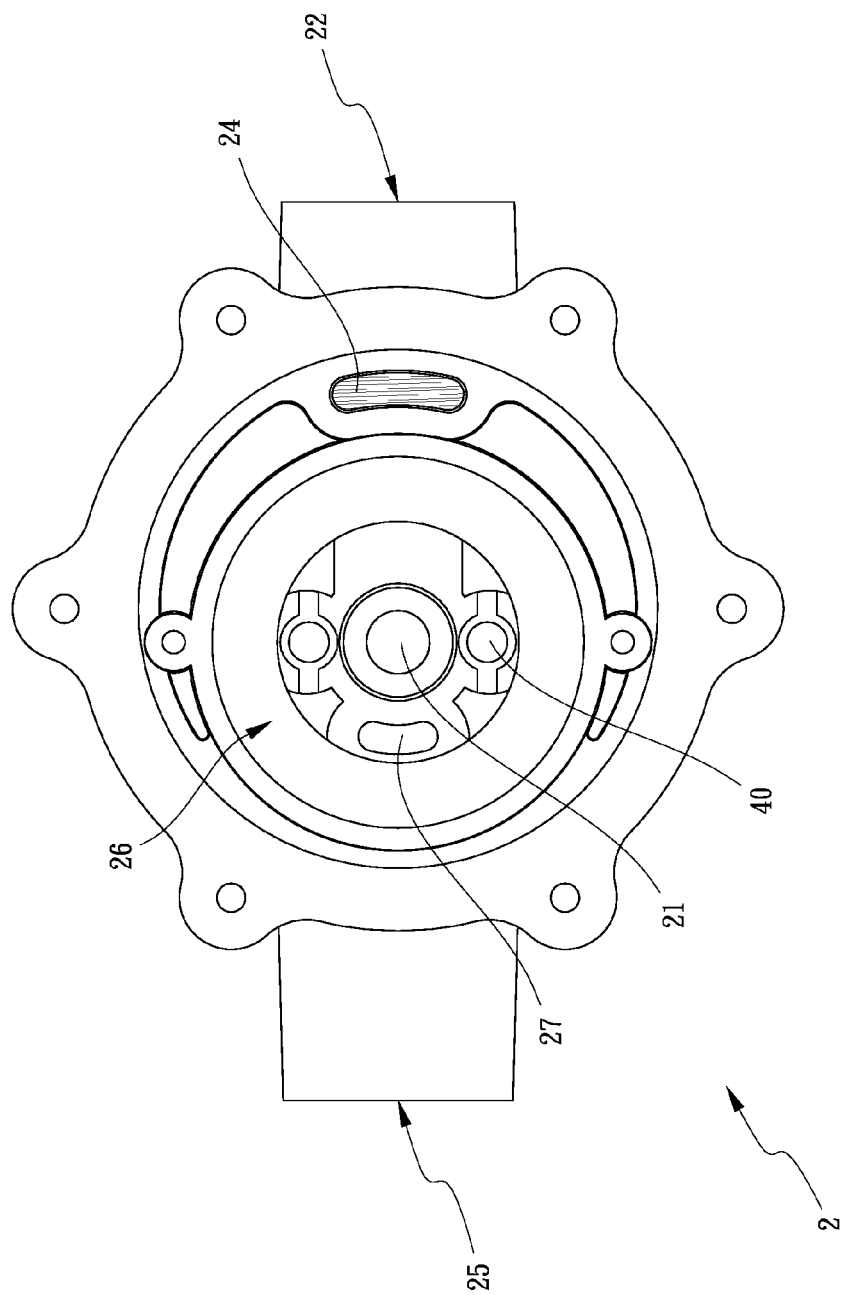
FIG. 4 is a top view of a valve body of the hydraulic valve shown in FIG. 3.

Referring now to FIGS. 3 and 4, the hydraulic valve 2 may further comprises at least one blowout preventer 4 to avoid blowout due to the reservoir pressure. The blowout preventer 4 includes an adjustment screw 41, a compression spring 42 and a stopper 43 together embedded in a respective pressure relief bore 40 which is defined in the valve body 20 of the valve housing. As best seen in FIG. 8, the pressure relief bore 40 has one end in communication with the chamber 26 and the other end in communication with the lateral port 21. The adjustment screw 41 is situated adjacent to the chamber 26 and the stopper 43 is adjacent to the lateral port 21, and the spring 42 is biased between the adjustment screw 41 and the stopper 43. In such a manner, if the reservoir pressure is in danger of blowout under a very high pressure and the regulation valve member 93 remains in its close position because the user fails to shut off the inlet pipeline 34, the stopper 43 of the blowout preventer 4 will be pushed upward by the fluid in the reservoir 1, which indirectly pressing the spring 42 to permit connection between the lateral port 21 and the chamber 26. Accordingly, the liquid in the reservoir 1 may instead go by the pressure relief bore 40 through the chamber 26 and finally to the third passageway 27 and the outlet port 25 so that the blowout can be avoided.

Referring to FIG. 9 or 10, in this embodiment, the reservoir 1 is a pressure tank with a diaphragm 8 inside to divide an interior space of the reservoir 1 into a liquid room 121 and a gas room 122. The liquid room 121 of the reservoir 1 is in fluid communication with the lateral port 21 of the hydraulic valve 2 via the opening 110 in the neck 11.

Figure 11:
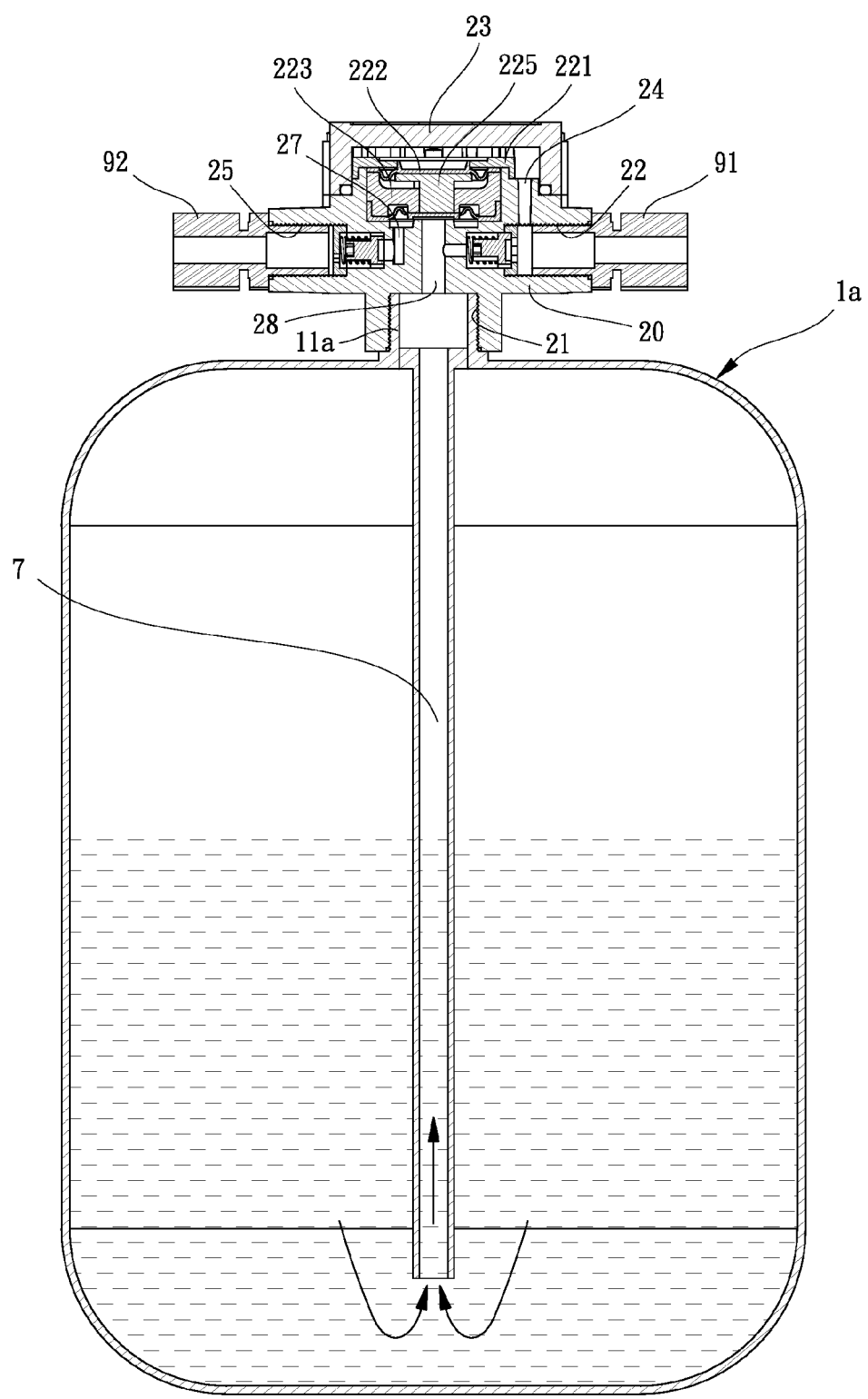
FIG. 11 is a cross sectional view of a liquid dispenser in accordance with a second embodiment of the present invention.

In the modification shown in FIG. 11, the reservoir 1a is a container with a conduit 7 inserted in the container. Specifically, the conduit 7 has one end secured in a neck 11a of the reservoir 1a and the other end reaching toward a bottom of the reservoir 1a. When a level of the liquid reaches to a certain height, the bottom of the reservoir 1a is under a high pressure. At this time, an user may shut off the inlet pipeline 34 to stop the brine from entering the inlet port 22 of the hydraulic valve 2 and then open up the outlet pipeline 35 to dispense the liquid because the pressure differential between the bottom of the reservoir 1 and the outlet pipeline 35 will automatically drive the liquid reflows from the reservoir 1 back to the first passageway 28, which then pushes indirectly the piston 225 upward to permit the liquid flow into the third passageway 27 via the chamber 26, as discussed in the first embodiment.

As described the above, the present invention is directed to a pressure differential type liquid dispenser such that no extra pump is needed for discharging liquid out of the reservoir of the liquid dispenser.

It is to be understood that the disclosed embodiments are illustrative in nature and the invention is not to be limited to any one or more embodiments except as set forth in the following claims.

What is claimed is:

1. A hydraulic valve, comprising:
a valve housing including an inlet port for connection to an inlet pipeline, a lateral port for connection to a reservoir, an outlet port for connection to an outlet pipeline, and a chamber; the valve housing further defining a bypass through which the inlet port is in fluid communication with the chamber, a first passageway through which the chamber is in selective fluid communication with the lateral port, a second passageway through which the inlet port is in selective fluid communication with the first passageway, and a third passageway through which the chamber is in fluid communication with the outlet port;
a first one-way valve member disposed in between the inlet port and the second passageway to permit fluid flow in a direction from the inlet port to the second passageway only;
a regulation valve member disposed in the chamber of the valve housing and being movable between a close position where the first passageway is blocked from fluid communication with the chamber, and an open position where the first passageway is in fluid communication with the third passageway via the chamber, wherein the regulation valve member moves to the close position if actuated by fluid coming from the bypass, and to the open position if actuated by fluid coming from the first passageway; and
a second one-way valve member disposed in between the third passageway and the outlet port to permit fluid flow in a direction from the third passageway to the outlet port only.

2. The hydraulic valve of claim 1, wherein the valve housing includes a valve body and a bonnet, the chamber is defined in between the valve body and the bonnet, and the bypass is defined in the valve body to be in communication with the chamber.

3. The hydraulic valve of claim 1, further comprising an O-ring to seal a valve body and a bonnet.

4. The hydraulic valve of claim 1, wherein the regulation valve member includes a valve seat, an upper diaphragm seal attached to a top of the valve seat, a lower diaphragm seal attached to a bottom of the valve seat, and a piston slidably inserted in a central bore of the valve seat and covered by the upper diaphragm seal; and the piston is slidable towards and away from the first passageway to permit disconnection or connection of the chamber to the first passageway.

5. The hydraulic valve of claim 4, wherein the regulation valve member further includes a guide disk disposed on the upper diaphragm seal to guide the fluid from the bypass towards the piston.

6. The hydraulic valve of claim 1, wherein the first one-way valve member includes a seat body secured in the inlet port, a plug slidably seated in the seat body and a spring urging the plug toward the seat body to releasably block at least one hole defined in the seat body.

7. The hydraulic valve of claim 1, wherein the second one-way valve member includes a seat body secured in the outlet port, a plug slidably seated in the seat body and a spring urging the plug away from the seat body to releasably block the third passageway.

8. The hydraulic valve of claim 1, further comprising at least one blowout preventer including an adjustment screw, a compression spring and a stopper, wherein the valve housing further defines at least one pressure relief bore with one end in communication with the chamber and the other end in communication with the lateral port; and the blowout preventer is disposed in the pressure relief bore with the adjustment screw adjacent to the chamber and the stopper adjacent to the lateral port and the spring biased between the adjustment screw and the stopper.

9. The hydraulic valve of claim 1, further comprising a threaded inlet pipe fitting and a threaded outlet pipe fitting, and wherein the inlet and outlet ports of the valve housing are threaded for receiving the threaded inlet and outlet pipe fittings respectively.

10. A liquid dispenser comprising a reservoir and a hydraulic valve as defined in claim 1, wherein the reservoir is provided with a neck which is fitted in the lateral port of the hydraulic valve to mount the hydraulic valve on the reservoir.

11. The liquid dispenser of claim 10, wherein the reservoir is a pressure tank with a diaphragm inside to divide an interior space of the reservoir into a liquid room and a gas room; and wherein the liquid room is in communication with the lateral port of the hydraulic valve via the neck.

12. The liquid dispenser of claim 10, further comprising a conduit with one end secured in the neck of the reservoir and the other end reaching toward a bottom of the reservoir.

* * * * *